June 5, 1923.
O. C. KERNS
1,457,307
VISE
Filed Feb. 20, 1922
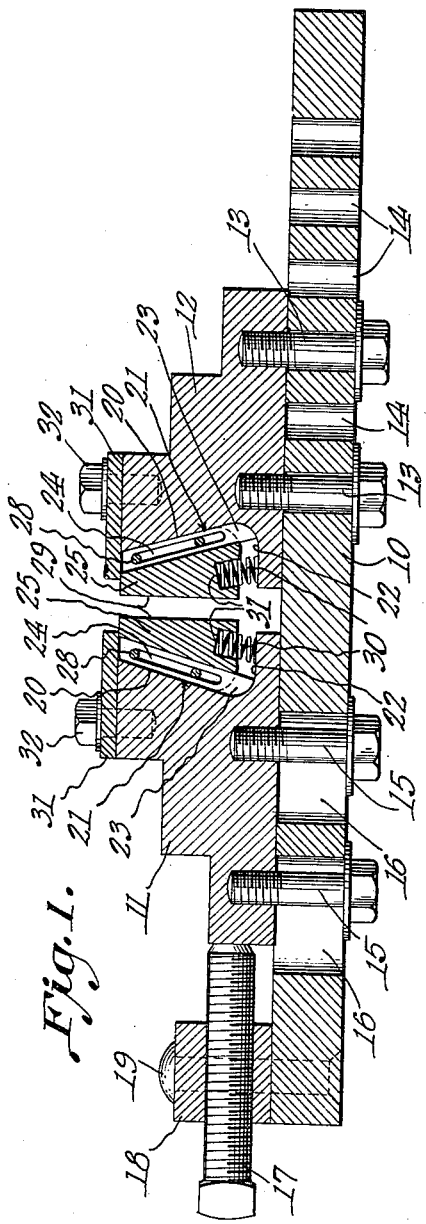
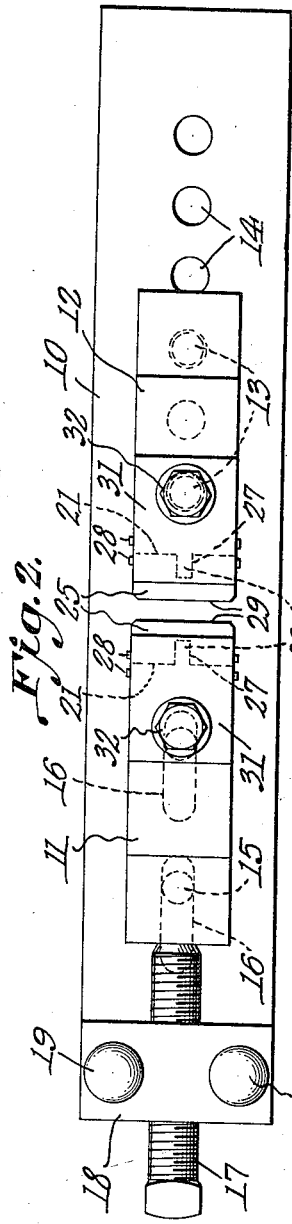
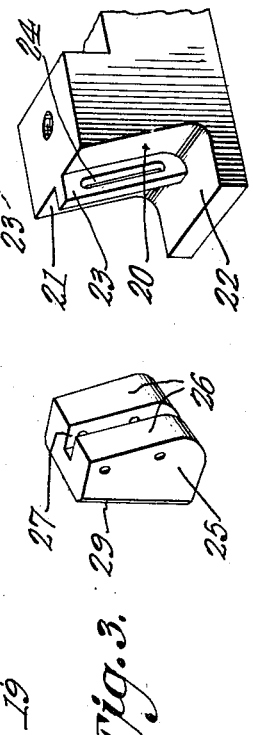
Inventor
O. C. Kerns
By Jerry A. Mathews
Attorney Patented June 5, 1923.

1,457,307

UNITED STATES PATENT OFFICE.

ORLANDO C. KERNS, OF AKRON, OHIO.

VISE.

Application filed February 20, 1922. Serial No. 538,030.

*To all whom it may concern:*

Be it known that I, ORLANDO C. KERNS, a citizen of the United States, residing at Akron, in the county of Summit and State of Ohio, have invented certain new and useful Improvements in Vises, of which the following is a specification.

My invention relates to improvements in jaws for vises, chucks or the like, adapted for use in machine tool work, while not necessarily restricted to this use.

An important object of the invention is to provide means of the above mentioned character, whereby the clamping jaws tend to draw the work downwardly or inwardly, and the tendency of the work to creep upwardly, is entirely overcome.

A further object of the invention is to provide means of the above mentioned character, which is extremely simple in construction, and having its parts so arranged that its auxiliary jaws have a substantial area of contact with the main jaws, whereby the vise is strong and durable.

Other objects and advantages of the invention will be apparent during the course of the following description.

In the accompanying drawings forming a part of this specification, and in which like numerals are employed to designate like parts throughout the same, Fig. 1 is a central vertical longitudinal section through a device embodying my invention, Fig. 2 is a plan view of the same, Fig. 3 is a perspective view of the auxiliary jaw, and, Fig. 4 is a similar view, parts broken away, of one main jaw.

In the drawings, wherein for the purpose of illustration is shown a preferred embodiment of my invention, the numeral 10 designates a flat base or body portion, upon which are mounted the main jaws 11 and 12. The main jaw 12 is held to the base 10 by machine bolts 13, passing through selected vertical openings 14, formed through the base 10. It is obvious that the jaw 12 may be longitudinally adjusted upon the base 10 and clamped thereto in a selected position. The co-acting main jaw 11 has connection with machine bolts 15, slidable within slots 16, serving as positive means to guide the jaw 11 longitudinally. The jaw 11 is moved inwardly by means of an adjusting bolt 17, operating through a screw threaded opening in a block 18, bolted to the body portion 10, as shown at 19.

The jaws 11 and 12 are provided upon their inner faces with cut out portions 20, Figs. 1 and 4, having upstanding inclined faces 21 and horizontal faces 22. The inclined faces 21 converge upwardly, as shown. Formed upon the faces 21 and integral therewith are ribs 23, having longitudinal slots 24 formed therein.

The numeral 25 designates auxiliary jaws, which are vertically movable with relation to the main jaws 11 and 12. These auxiliary jaws have inclined faces 26, upon their outer sides, which converge upwardly, and are adapted to directly contact with the faces 21. The area of contact between the faces 26 and 21 is relatively large, and hence the construction is strong. The faces 26 are provided with longitudinal grooves 27, receiving the ribs 23, and transverse pins 28 carried by the jaws 25 pass through the longitudinal slots 24. The inner faces 29 of the jaws 25 are parallel and are retained permanently in this relation by the inclined faces 21 and 26, which have the same inclination, as is obvious.

The auxiliary jaws 24 are moved inwardly by means of compressible coil springs 30, the upper ends of which are held within recesses 31, and the lower ends engage the horizontal faces 22, as shown. The upward movement of the auxiliary jaws 25 are limited by the transverse pins 28 and stop plates 31, projecting inwardly from the same, and held upon the main jaws by bolts 32 or the like. These stop plates also prevent dirt or the like from passing between the contacting faces of the main jaws and the auxiliary jaws.

In the use of the vise, when the work is placed between the auxiliary jaws 25, which are normally in the elevated position, and the bolt 17 screwed up, the main jaw 11 will be shifted toward the main jaw 12. The auxiliary jaws 25 will thus have their parallel faces 29 brought into clamping engagement with the work, and by virtue of the inclination of the faces 21 and 26, there will be a tendency for the auxiliary jaws to move downwardly, thereby positively holding the work from creeping upwardly.

While I have shown my invention as applied to a vise having a base 10, it is not restricted to such application. The main and auxiliary jaws may be embodied in a vise of different construction, or in chucks or the like.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In a holding device of the character described, main jaws, said jaws being provided upon their inner sides with cut out portions, said cut out portions having upstanding inclined faces converging upwardly, said faces having longitudinal ribs projecting inwardly and laterally from the faces provided with slots, auxiliary jaws arranged within the cut out portions and having outer inclined faces converging upwardly to slidably contact with the inclined faces of the main jaws, said auxiliary jaws being provided in their inclined faces with longitudinal grooves receiving said ribs, transverse elements carried by the auxiliary jaws and passing through the longitudinal slots in the ribs and serving as stops to limit the upward movement of the auxiliary jaws, springs arranged beneath the jaws and serving to move them upwardly, and means to adjust one main jaw with relation to the other.

2. In a holding device of the character described, main jaws carried by the base and provided upon their inner sides with cut out portions, said cut out portions having inclined upwardly converging faces, said faces having longitudinal ribs provided with slots, auxiliary jaws slidable within the cut out portions and having outer inclined faces which converge upwardly and inner substantially parallel faces, said outer inclined faces having longitudinal grooves to receive the ribs of the main jaws, transverse elements carried by the main jaws and extending through the slots in the ribs, compressible coil springs arranged beneath the auxiliary jaws and serving to move them upwardly, plates attached to the tops of the main jaws and projecting inwardly beyond them to extend over portions of the auxiliary jaws and limit their upward movement, and means to adjust one main jaw with relation to the other.

In testimony whereof I affix my signature.

ORLANDO C. KERNS.